United States Patent
Koo et al.

(10) Patent No.: US 9,377,842 B2
(45) Date of Patent: Jun. 28, 2016

(54) METHOD AND APPARATUS FOR REALIZING CPU POWER CONSERVATION

(71) Applicant: Huawei Technologies Co., Ltd., Shenzhen (CN)

(72) Inventors: David Koo, Shenzhen (CN); Li Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 13/904,461

(22) Filed: May 29, 2013

(65) Prior Publication Data
US 2013/0268787 A1 Oct. 10, 2013

Related U.S. Application Data

(63) Continuation of application No. PCT/CN2011/074866, filed on May 30, 2011.

(30) Foreign Application Priority Data

Nov. 29, 2010 (CN) .......................... 2010 1 0571667

(51) Int. Cl.
  *G06F 1/32* (2006.01)
  *G06F 9/50* (2006.01)
(52) U.S. Cl.
  CPC .............. *G06F 1/324* (2013.01); *G06F 1/3203* (2013.01); *G06F 1/329* (2013.01); *G06F 9/505* (2013.01); *G06F 9/5083* (2013.01); *G06F 9/5094* (2013.01); *Y02B 60/1217* (2013.01); *Y02B 60/142* (2013.01); *Y02B 60/144* (2013.01)
(58) Field of Classification Search
  None
  See application file for complete search history.

(56) References Cited

U.S. PATENT DOCUMENTS 6,073,244 A 6/2000 Iwazaki
2005/0132238 A1* 6/2005 Nanja ........................ 713/300

(Continued)

FOREIGN PATENT DOCUMENTS

CN 1690955 A 11/2005
CN 101067758 A 11/2007

(Continued)

OTHER PUBLICATIONS

International Search Report issued in corresponding PCT Patent Application No. PCT/CN2011/074866, mailed Sep. 8, 2011, 4 pages.

(Continued)

*Primary Examiner* — Paul Yanchus, III
*Assistant Examiner* — Joshua Neveln
(74) *Attorney, Agent, or Firm* — Brinks Gilson & Lione

(57) ABSTRACT

A method and apparatus are disclosed for conserving CPU power. The method includes: obtaining CPU occupation rates of all threads triggering frequency adjustment in each domain and domains those threads belong to; in a domain a thread triggering frequency adjustment belongs to, calculating a target CPU frequency to be adjusted to according to the CPU occupation rate of the thread triggering frequency adjustment; calculating a timer parameter according to the target CPU frequency and setting a CPU frequency value for the thread triggering frequency adjustment. CPU frequency values of threads in each domain are synchronized according to the CPU occupation rate of each thread trigging frequency adjustment in this disclosure, so as to synchronize the CPU frequency values in a multi-core system to conserve CPU power.

24 Claims, 10 Drawing Sheets

(56) References Cited

U.S. PATENT DOCUMENTS

2009/0271646 A1* 10/2009 Talwar et al. ............... 713/322
2011/0047401 A1* 2/2011 Werner ....................... 713/500

FOREIGN PATENT DOCUMENTS

| CN | 101201689 A | 6/2008 |
| CN | 100562854 C | 11/2009 |
| CN | 101576768 A | 11/2009 |
| CN | 102004543 A | 4/2011 |

OTHER PUBLICATIONS

Written Opinion of the International Searching Authority issued in corresponding PCT Patent Application No. PCT/CN2011/074866, mailed Sep. 8, 2011, 5 pages.

Chinese Patent No. 102004543 B, issued on Aug. 7, 2013, granted in corresponding Chinese Patent Application No. 201010571667.9, 1 page.

* cited by examiner

METHOD AND APPARATUS FOR REALIZING CPU POWER CONSERVATION

CROSS-REFERENCE TO RELATED APPLICATIONS

This application is a continuation of International Application No. PCT/CN2011/074866, filed on May 30, 2011, which claims priority to Chinese Patent Application No. 201010571667.9, filed on Nov. 29, 2010, both of which are hereby incorporated by reference in their entireties.

FIELD

The present disclosure relates to a method and apparatus for conserving CPU power, and more specifically, to a method and apparatus for conserving CPU power in a multi-core system mode.

DESCRIPTION OF THE RELATED ART

Power conservation and emission reduction has become a hot issue in international politics and economics, and power conservation of communication devices has been paid the closest attention due to the wide applications of communication devices. In a typical telecommunication environment, a set of monoboards are arranged in a set of frames, each monoboard has a plurality of executing entities thereon, those entities may be CPUs, cores, VCPUs or Hyperthreads (logical cores). One CPU may have multiple cores, each core may have one or more hardware threads. An OS (Operation System) instance may be deployed on one or more executing entities, wherein CPU power conservation can be realized by adjusting a frequency to a lower frequency step by step to reduce power consumption.

Existing OS instances mainly include SMP (Symmetric multiprocessing) and AMP (asymmetric multiprocessing). For SMP, because there is only one OS instance, the OS instance may simultaneously manage all CPU cores, periodically monitor the CPU occupation rate, and adjust the CPU frequency upon finding too high or too low CPU occupation rates so as to achieve the goal of power conservation. For a multi-core system in an AMP deploying mode or a multi-core system in an AMP and SMP hybrid deploying mode, a main characteristic thereof is that there are a plurality of instances of an operation system executing in one domain, each of those OS instances may independently control its own CPU main frequency, and all hardware threads share a same CPU frequency in one domain. However, if a plurality of OS instances run on a domain, conflicts may occur when each OS instance attempts to control its CPU frequency separately.

During making the present disclosure, the inventors have found the following problems present in the prior art: in existing CPU power conservation techniques, for multi-core systems, it is impossible to realize power conservation through CPU frequency adjustment.

SUMMARY

A method and apparatus for conserving CPU power are provided in embodiments of this disclosure, capable of synchronizing CPU frequency values in a multi-core system to realize CPU power conservation.

A method for conserving CPU power, comprising:

obtaining CPU occupation rates of all threads triggering frequency adjustment in each domain and domains those threads belong to;

in a domain a thread triggering frequency adjustment belongs to, calculating a target CPU frequency to be adjusted to according to the CPU occupation rate of the thread triggering frequency adjustment;

calculating a timer parameter according to the target CPU frequency and setting a CPU frequency value for the thread triggering frequency adjustment.

An apparatus for conserving CPU power, comprising:

a domain obtaining unit, configured to obtain CPU occupation rates of all threads triggering frequency adjustment in each domain and domains those threads belong to;

a frequency calculating unit, configured to calculate, in a domain a thread triggering frequency adjustment belongs to, a target CPU frequency to be adjusted to according to the CPU occupation rate of the thread triggering frequency adjustment obtained by the domain obtaining unit;

a frequency adjusting unit, configured to calculate a timer parameter according to the target CPU frequency obtained by the frequency calculating unit and set a CPU frequency value for the thread triggering frequency adjustment.

It can be seen from the above solutions provided in embodiments of this disclosure that CPU frequency values of threads in each domain are synchronized according to the CPU occupation rate of each thread trigging frequency adjustment, so as to synchronize the CPU frequency values in a multi-core system, thus CPU power conservation can be realized.

BRIEF DESCRIPTION OF THE DRAWINGS

For a more explicit description of solutions of embodiments of this disclosure, a brief introduction of accompanying drawings to be used in the description of these embodiments will be given below. Obviously, accompanying drawings described below are merely some embodiments of this disclosure, for those skilled in the art, other accompanying drawings can be derived from these ones without any creative efforts.

DETAILED DESCRIPTION OF THE PREFERRED EMBODIMENT

A clear and complete description of solutions of embodiments of this disclosure will be given in connection with accompanying drawings of those embodiments. Obviously, the embodiments described herein are merely some of the embodiments of this disclosure, but not all of them. Based on the embodiments in this specification, other embodiments can occur to those skilled in the art without any creative efforts, all of which fall within the scope of this disclosure.

Figure 1:
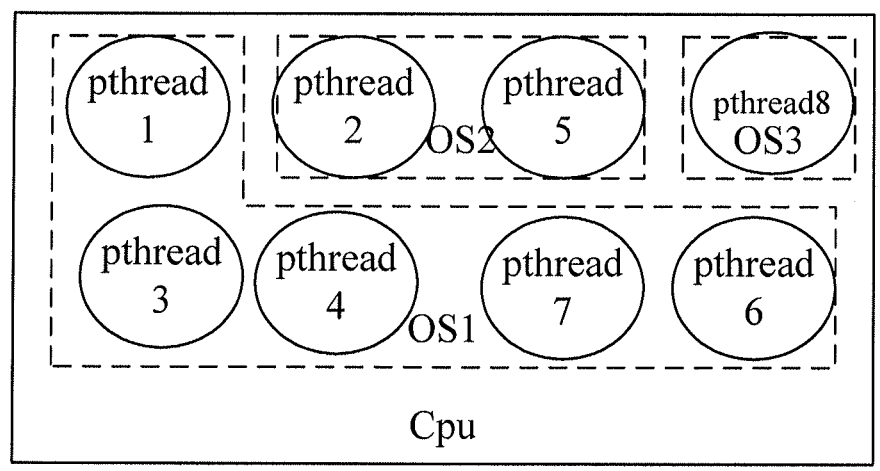
FIG. 1 is a schematic structure diagram of a AMP and SMP hybrid deploying mode provided in an embodiment of this embodiment.

A method for realizing CPU power conservation is provided in an embodiment of this disclosure, comprising: obtaining CPU occupation rates of all threads triggering frequency adjustment in each domain and domains those threads belong to; in a domain a thread triggering frequency adjustment belongs to, calculating a target CPU frequency to be adjusted to according to the CPU occupation rate of the thread triggering frequency adjustment; calculating a timer parameter according to the target CPU frequency and setting a CPU frequency value for the thread triggering frequency adjustment. FIG. 1 shows a multi-core system in an AMP and SMP hybrid deploying mode, wherein domain 1 includes pthread 1, 2, 3 and 4; and domain 2 includes pthread 5, 6, 7 and 8. Each circle represents a cores with identical physical properties. All hardware threads in a domain share the same CPU primary frequency. There is a hardware thread in each domain (pthread 1 and pthread 5 in FIG. 1), representing a primary hardware thread in the domain, and other hardware threads are secondary hardware threads. Particularly, according to the deploying mode of FIG. 1, each OS instance has a hardware thread CpuFreq, and the CpuFreq creates CpuGover threads according to the number of domains that the instance spans, and thus we have the following relationships:

OS1 comprises CpuFreq1, and CpuFreq1 comprises CpuGover1.1 (comprising pthread 1, 3 and 4, which belong to domain 1) and CpuGover1.2 (comprising pthread 6 and 7, which belong to domain 2);
OS2 comprises CpuFreq2, and CpuFreq2 comprises CpuGover2.1 (comprising pthread 2, which belongs to domain 1) and CpuGover2.2 (comprising pthread 5, which belongs to domain 2);
OS3 comprises CpuFreq3, and CpuFreq3 comprises CpuGover3 (comprising pthread 8, which belongs to domain 2).

A CpuGover thread mainly takes charge of monitoring and obtaining CPU occupation rates, and then reports to its supervisor CpuFreq. The CpuGover is not distributed in concept, namely, it can only "see" itself in an OS instance, and can see neither other interior Govers within the OS instance, nor Govers in other OS instances.

A CpuFreq takes charge of collecting CPU occupation rates, analyzes and processes the CPU occupation rates, and then synchronizes its analysis result to a primary CpuFreq. Each CpuFreq adjusts a timer parameter by itself, and it is the primary CpuFreq that performs frequency setting finally.

Because CpuFreqs are presented in a distributed manner, it is necessary to synchronize information therebetween, wherein the processing of CPU occupation rates comprises selecting an appropriate CPU occupation rate according to a configuration strategy from multiple CPU occupation rate values, and then a hardware-supported feature setting a frequency and updating a timer parameter to guarantee the consistency between time and frequency.

Figure 2:
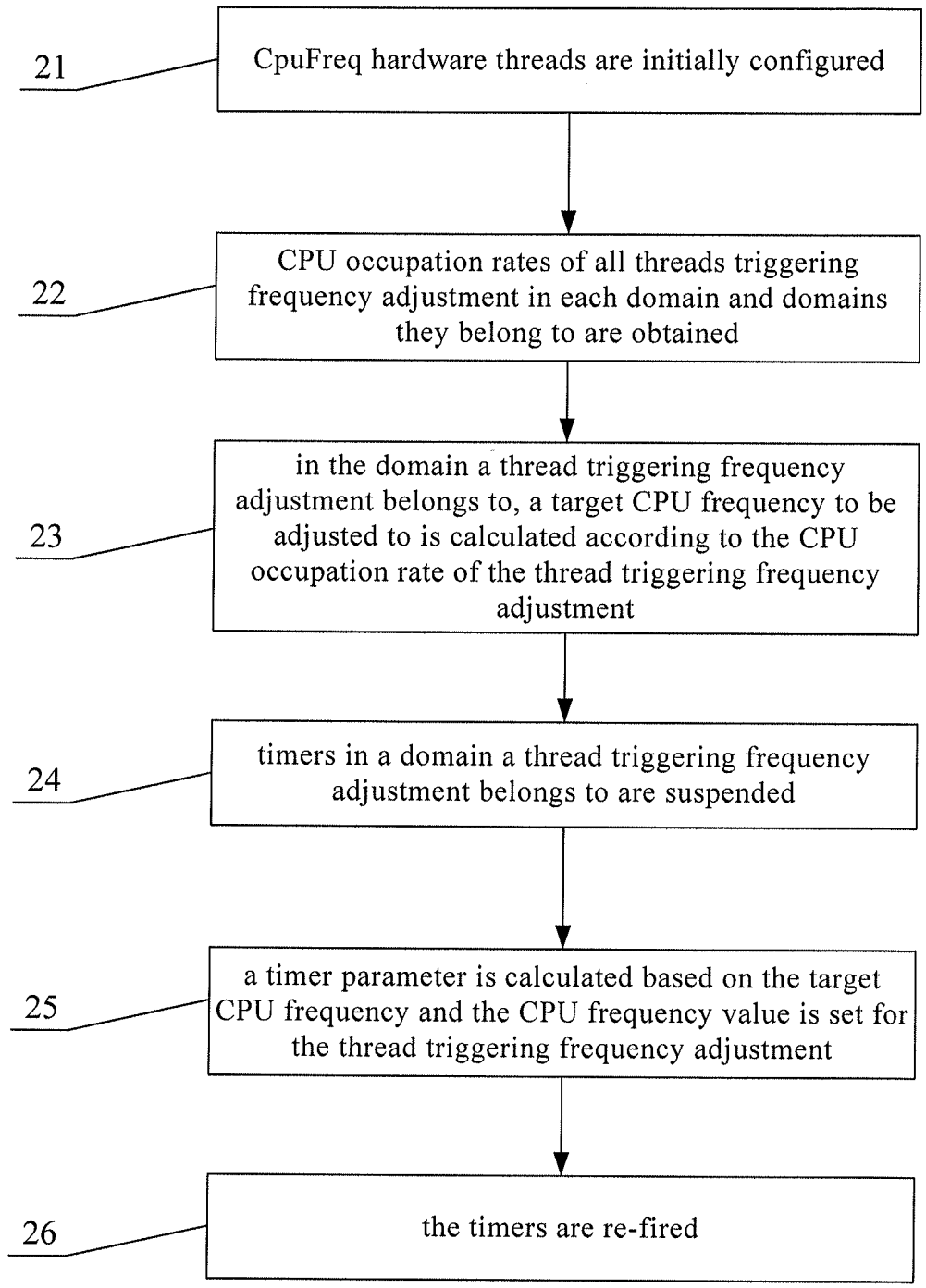
FIG. 2 is a schematic diagram of a flowchart of a method for conserving CPU power in a multi-core system mode provided in an embodiment of this embodiment.

Below, a method for conserving CPU power will be described in detail according to the sequence of CPU frequency adjustment by each thread, as shown in FIG. 2, the method may particularly comprise the following steps.

At step 21, CpuFreq hardware threads are initially configured.

The identity determination of a CpuFreq and its deployment are accomplished through configuration, wherein configuration information comprises public information and private information, the public information comprises IDs of all domains on a monoboard, and local information of CpuFreqs in each domain; the private information comprises domain features in an OS in which it is located. A configured CpuFreq may create CpuGover instances. Because dynamical creation is supported, CpuFreq needs to register new CpuGovers after cleaning original ones, and then initiate thread monitoring.

Figure 3:
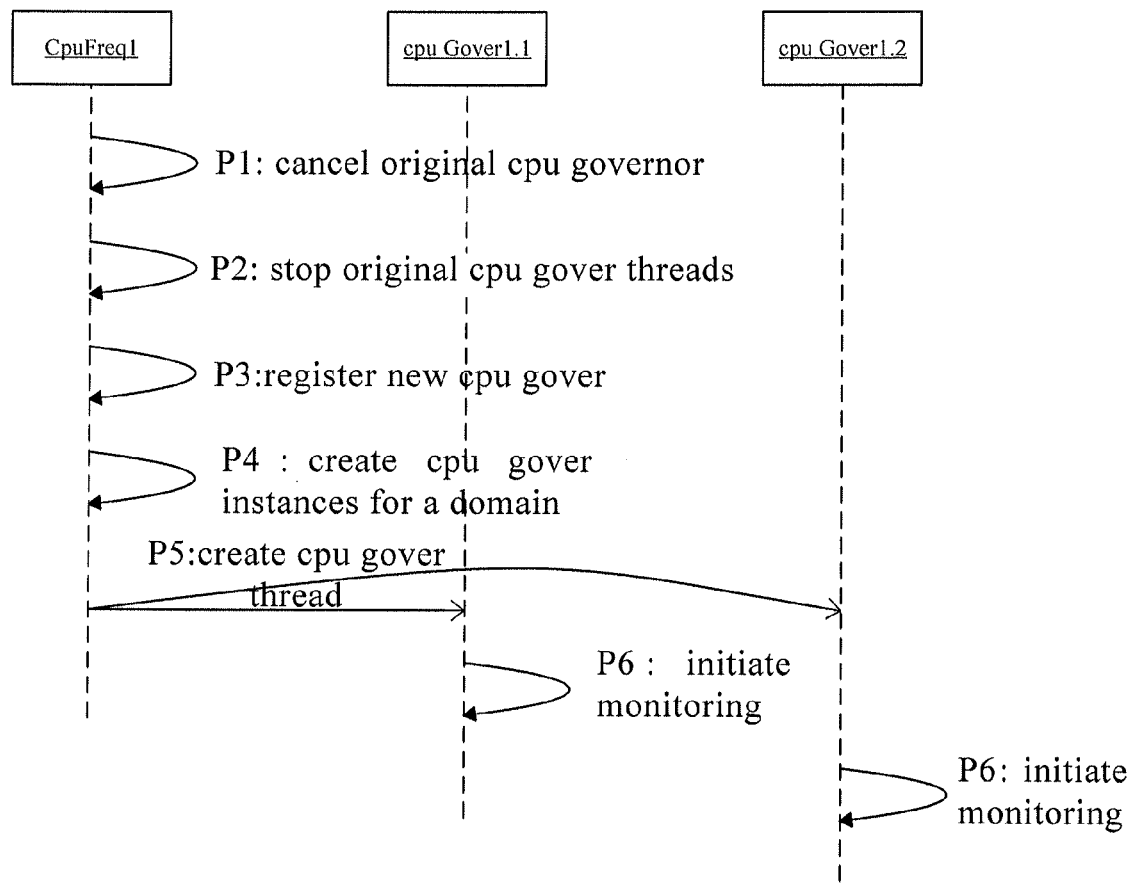
FIG. 3 is a sequential diagram of initially configuring CpuFreq 1 thread provided in an embodiment of this embodiment.

Particularly, taking CpuFreq1 as an example, in FIG. 3, CpuFreq1 cancels original cpu governors and stops original cpu gover threads, and then registers new cpu gover and creates new cpu gover instances in a domain and creates cpu gover threads. The created threads comprise CpuGover1.1 and CpuGover1.2, and after the creation of those threads the monitoring of each thread is initiated.

At step 22, CPU occupation rates of all threads triggering frequency adjustment in each domain and domains they belong to are obtained.

Hierarchically, CpuGover is located at a lower layer and CpuFreq is located at an upper layer. In an OS instance, there may be multiple instances in the lower layer, which are aggregated and integrated into a hardware thread in the upper layer. Each thread is provided with a timer, the step of which has the CPU occupation update frequency as its reference.

Figure 4:
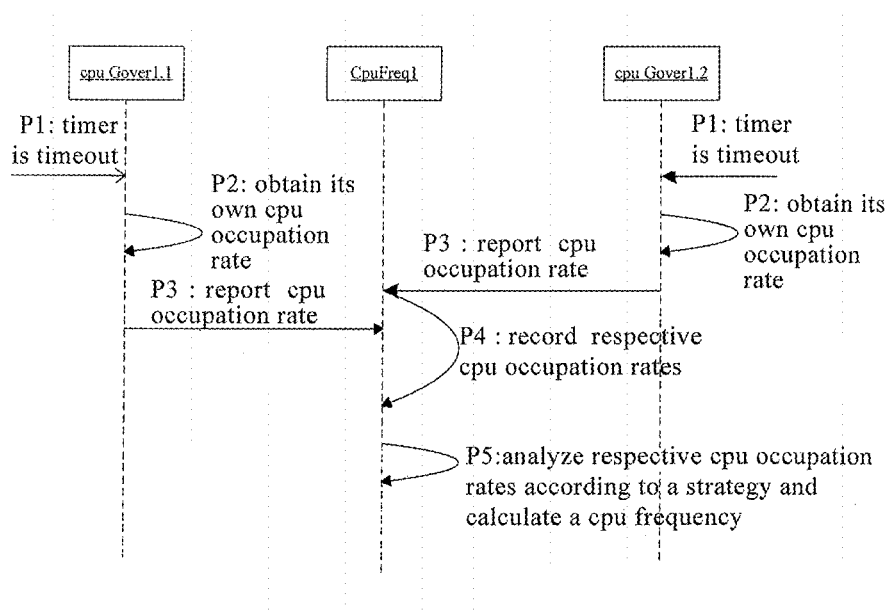
FIG. 4 is a sequential diagram of calculating a target CPU frequency by the CpuFreq 1 thread provided in an embodiment of this embodiment.

Particularly, taking CpuFreq 1 as an example, as shown in FIG. 4, if the timer is timeout, CpuGover1.1 and CpuGover1.2 obtain their own CPU occupation rates and report them to CpuFreq1, CpuFreq1 records the CPU occupation rate of each thread, and determine which domain a corresponding thread belongs to according to configuration information of each thread.

A threshold may be set for determining when CpuGover reports its CPU occupation rate, CpuGover reports its CPU occupation rate to CpuFreq when a variance in the CPU occupation rate is larger than the threshold; otherwise, CpuGover does not report its CPU occupation rate when a variance in the CPU occupation rate is less than the threshold to reduce unnecessary message flow.

At step 23, in the domain a thread triggering frequency adjustment belongs to, a target CPU frequency to be adjusted to is calculated according to the CPU occupation rate of the thread triggering frequency adjustment.

In the process of calculating the target CPU frequency, a thread having the highest CPU occupation rate is first selected for processing, to calculate a timer parameter of an OS instance in which the thread is located. If CpuFreq cannot obtain information of a primary CpuFreq of the domain, the process will be carried out with the highest frequency.

Particularly, taking CpuFreq 1 as an example, as shown in FIG. 4, depending on a strategy, CpuFreq 1 calculates a target CPU frequency to be adjusted to according to the CPU occupation rates of CpuGover1.1 and CpuGover1.2. The strategy may be configured in configuration information during initialization. A corresponding strategy may be: screening CPU occupation rates and obtain nominal CPU frequency corresponding to those CPU occupation rates.

At step 24, timers in a domain a thread triggering frequency adjustment belongs to are suspended.

Particularly, CpuFreq1 first notifies CpuFreqs in other domains to suspend their timers, when the CpuFreqs in other domains have suspend their timers and return suspense responses to CpuFreq1, CpuFreq1 suspends timers in its own domain, keeping the timing of all timers consistent as much as possible, also improving the reliability of CPU frequency adjustment.

At step 25, a timer parameter is calculated based on the target CPU frequency and the CPU frequency value is set for the thread triggering frequency adjustment.

Since a key timer parameter may be adjusted in the adjustment of the timer (for example, for a tick value, if the timer is set to be triggered for timer checking at every 100 ticks, it is possible to trigger the timer checking at every 200 ticks after the adjustment), therefore, before the CPU frequency adjustment, a corresponding timer parameter may be selected as an updated time parameter according to the correspondence relationship between CPU frequencies and time parameters in a configuration table of an OS instance.

Particularly, CpuFreq1 sends the target CPU frequency to CpuFreqs in other domains, each CpuFreq may calculate its appropriate timer parameter according to the target CPU frequency. After the calculation of the timer parameter, the CPU frequency value is adjusted by invoking a CPU driving program. Dynamic loading is also supported for a multi-core system in an AMP and SMP hybrid deploying mode.

At step 26, the timers are re-fired.

In order to ensure the reliability of a multi-core system in an AMP and SMP hybrid deploying mode, after each CPU frequency setting, it is also needed to re-fire the timers. So that, when the CPU frequency adjustment has failed, the present operation can be given up, and the CPU frequency will be adjusted again at a next time when a timer is timeout.

Furthermore, at step 25, for the case as shown in FIG. 1, there are different cases of CPU frequency adjustment by threads in the same domain of the same OS instance, CPU frequency adjustment by threads in different domains in the same OS instance, and CPU frequency adjustment by threads in different domains in different OS instances, which will be described in detail below.

Embodiment 1 of CPU Frequency Adjustment

Figure 5:
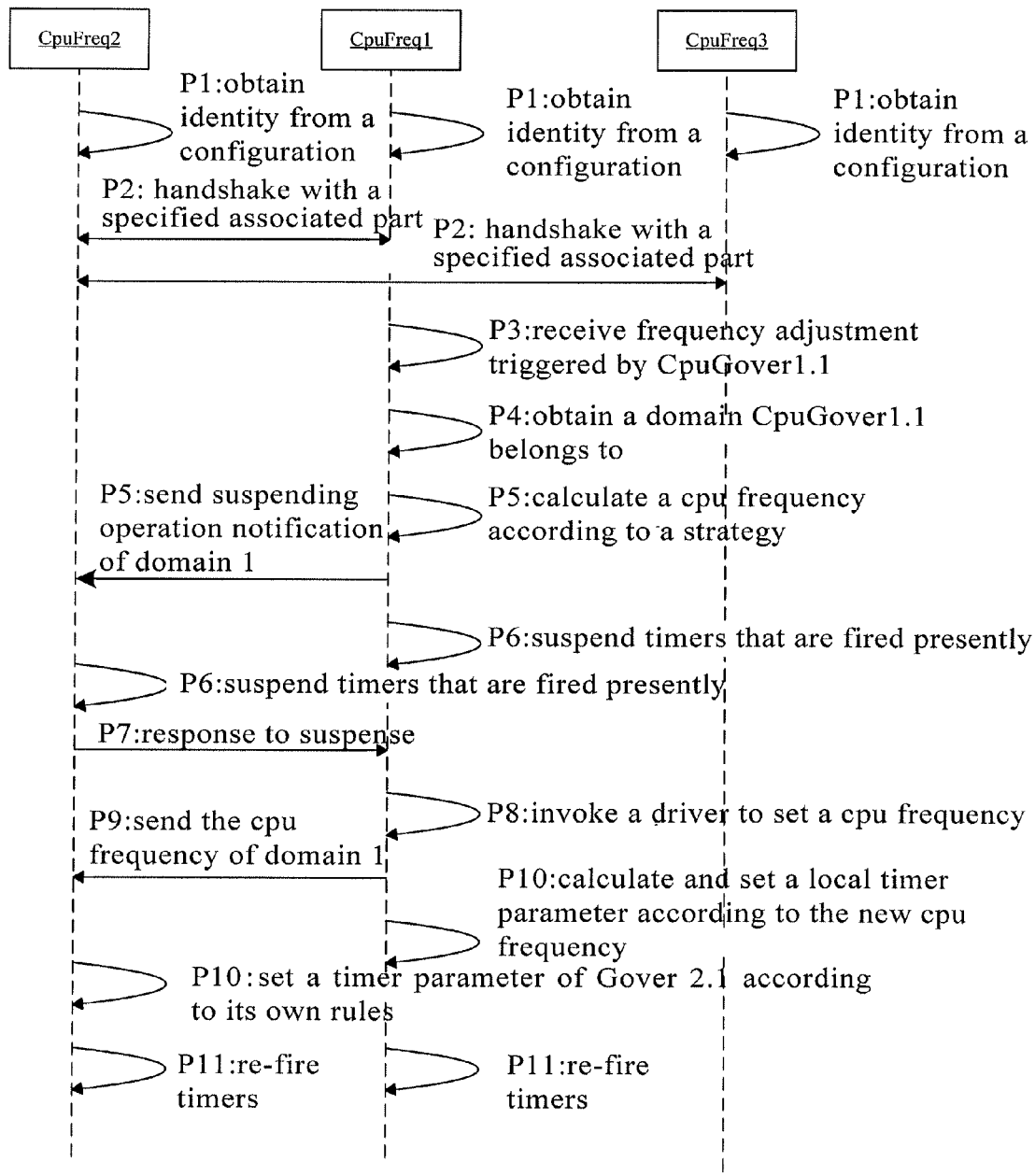
FIG. 5 is a sequential diagram of CPU frequency adjustment in a frequency adjustment flow triggered by CpuGover 1.1 provided in an embodiment of this embodiment.

As shown in FIG. 5, when CpuGover1.1 triggers the frequency adjustment flow, a primary hardware thread CpuFreq1 (corresponding to pthread 1 in FIG. 1) of an OS instance it belongs to is first reported, after CpuFreq1 has calculated a target CPU frequency to be adjusted to, a suspending operation notification is sent to a primary hardware thread CpuFreq2 in domain 2 (corresponding to pthread 5 in FIG. 1) (because the domain 1 where the thread triggering frequency adjustment is located only comprises two instances of OS1 and OS2, the CPU frequency adjustment is only performed by the primary hardware threads of OS1 and OS2). When CpuFreq1 and CpuFreq2 have suspended timers that have been fired presently, CpuFreq1 invokes a CPU driving program to set the CPU frequency, and sends the CPU frequency to CpuFreq2. CpuFreq1 calculates and sets a local timer parameter according to the new CPU frequency, while CpuFreq2 also sets the timer parameter of CpuGover2.1 according to its rules (CpuGover2.1 is a thread of OS1 which is located in domain 2, thus it is required to be synchronized when OS1 sets the CPU frequency, and the synchronization operation is accomplished by the primary hardware thread CpuFreq2 in domain 2). After the timer parameter is set, CpuFreq1 and CpuFreq2 re-fire the timers, and the present frequency adjustment is finished.

Embodiment 2 of CPU Frequency Adjustment

Figure 6:
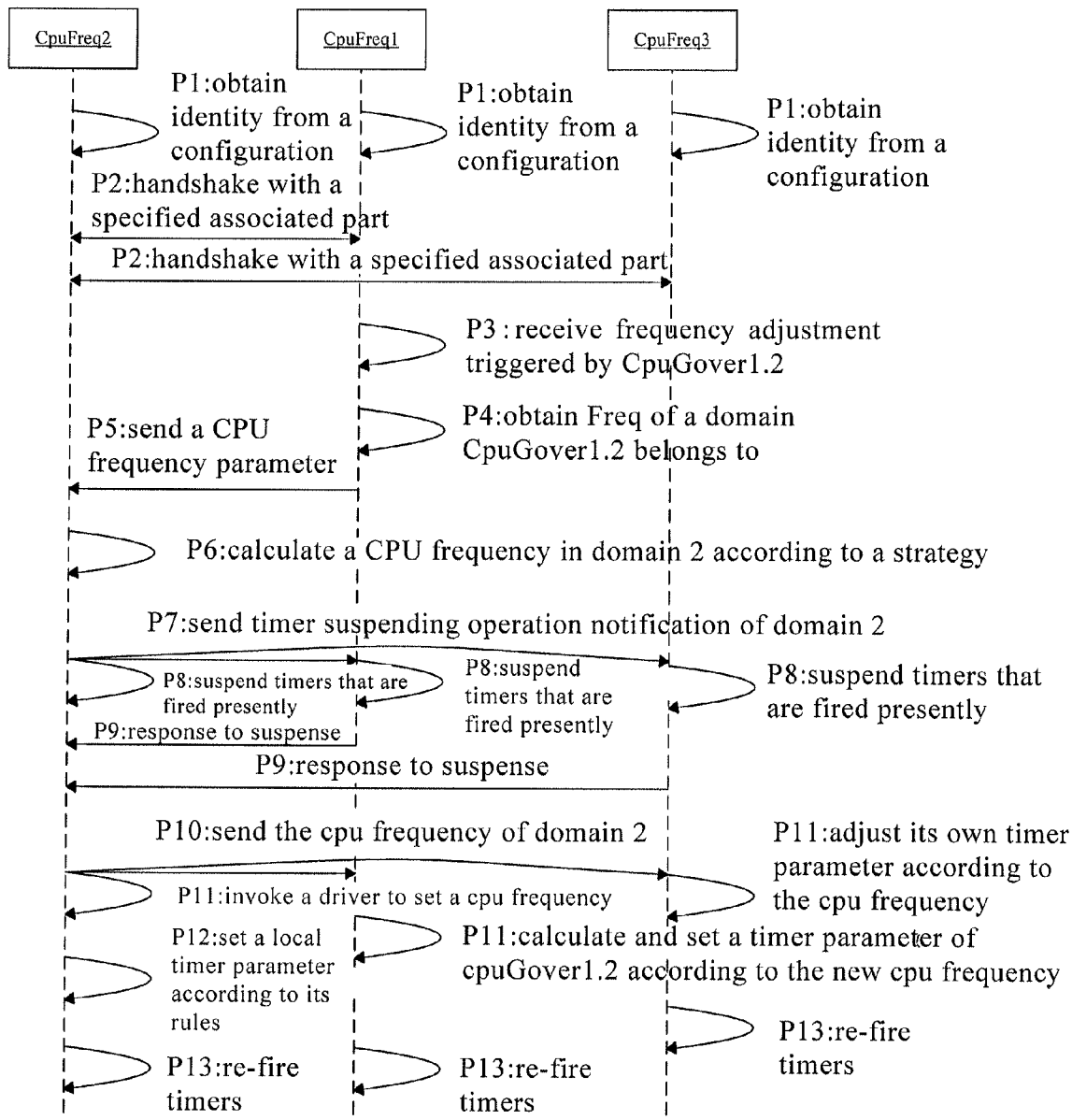
FIG. 6 is a sequential diagram of CPU frequency adjustment in a frequency adjustment flow triggered by CpuGover 1.2 provided in an embodiment of this embodiment.

As shown in FIG. 6, when CpuGover1.2 triggers the frequency adjustment flow, a primary hardware thread CpuFreq 1 of an OS instance it belongs to is first reported, CpuFreq 1 sends a CPU frequency parameter to a primary hardware thread CpuFreq2 of domain 2, after CpuFreq2 has calculated a target CPU frequency to be adjusted to, a suspending operation notification is sent to a primary hardware thread CpuFreq2 and a secondary hardware thread CpuFreq3 of domain 2 (because domain 2 where the thread triggering frequency adjustment is located comprises three instances of OS1, OS2 and OS3, it is necessary to perform the CPU frequency adjustment by the primary hardware threads of OS1, OS2 and the secondary thread of OS3). When CpuFreq1 CpuFreq2 and CpuFreq3 have suspended timers that have been fired presently, CpuFreq2 invokes a CPU driving program to set the CPU frequency, and sends the CPU frequency to CpuFreq1 and CpuFreq3. CpuFreq2 sets a local timer parameter according to its rules, while CpuFreq1 sets the timer parameter of CpuGover1.2 according to its rules, and CpuFreq3 adjusts its timer parameter according to the new CPU frequency. After the timer parameter has been set, CpuFreq1, CpuFreq2 and CpuFreq3 re-fire the timers, and the present frequency adjustment is finished.

Embodiment 3 of CPU Frequency Adjustment

Figure 7:
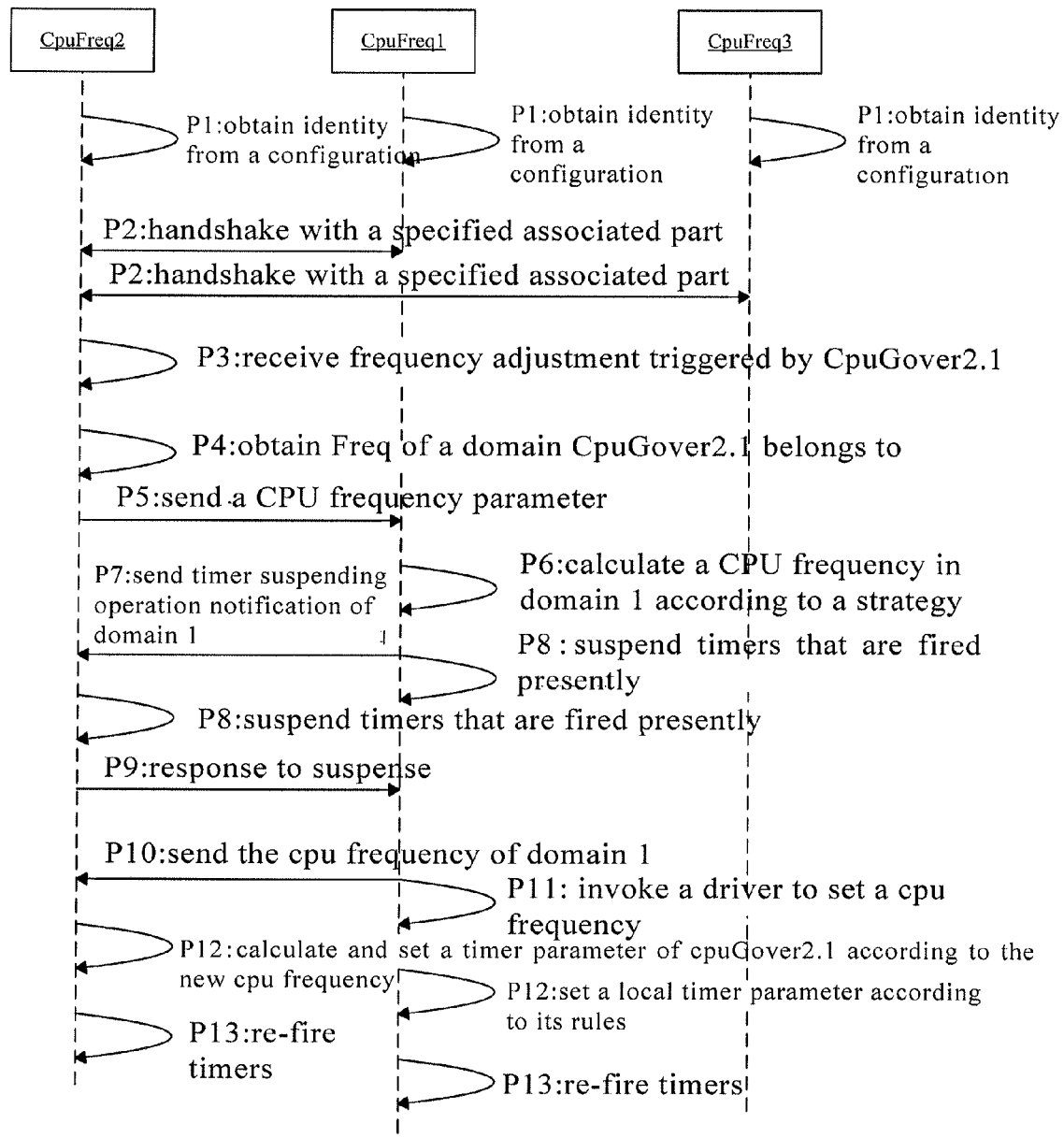
FIG. 7 is a sequential diagram of CPU frequency adjustment in a frequency adjustment flow triggered by CpuGover 2.1 provided in an embodiment of this embodiment.

As shown in FIG. 7, when CpuGover2.1 triggers the frequency adjustment flow, a primary hardware thread CpuFreq2 of an OS instance it belongs to is first reported, CpuFreq2 sends a CPU frequency to a primary hardware thread CpuFreq1 of domain 1, after CpuFreq1 has calculated a target CPU frequency to be adjusted to, it sends a suspending operation notification to the primary hardware thread CpuFreq2 of domain 2. When CpuFreq1 and CpuFreq2 have suspended timers that have been fired presently, CpuFreq1 invokes a CPU driving program to set the CPU frequency and sends the CPU frequency to CpuFreq2. CpuFreq1 sets a local timer parameter according to its rules, while CpuFreq2 calculates and sets the timer parameter of CpuGover2.1 according to the new CPU frequency. After the timer parameter has been set, CpuFreq1 and CpuFreq2 re-fire the timers, and the present frequency adjustment is finished.

Embodiment 4 of CPU Frequency Adjustment

Figure 8:
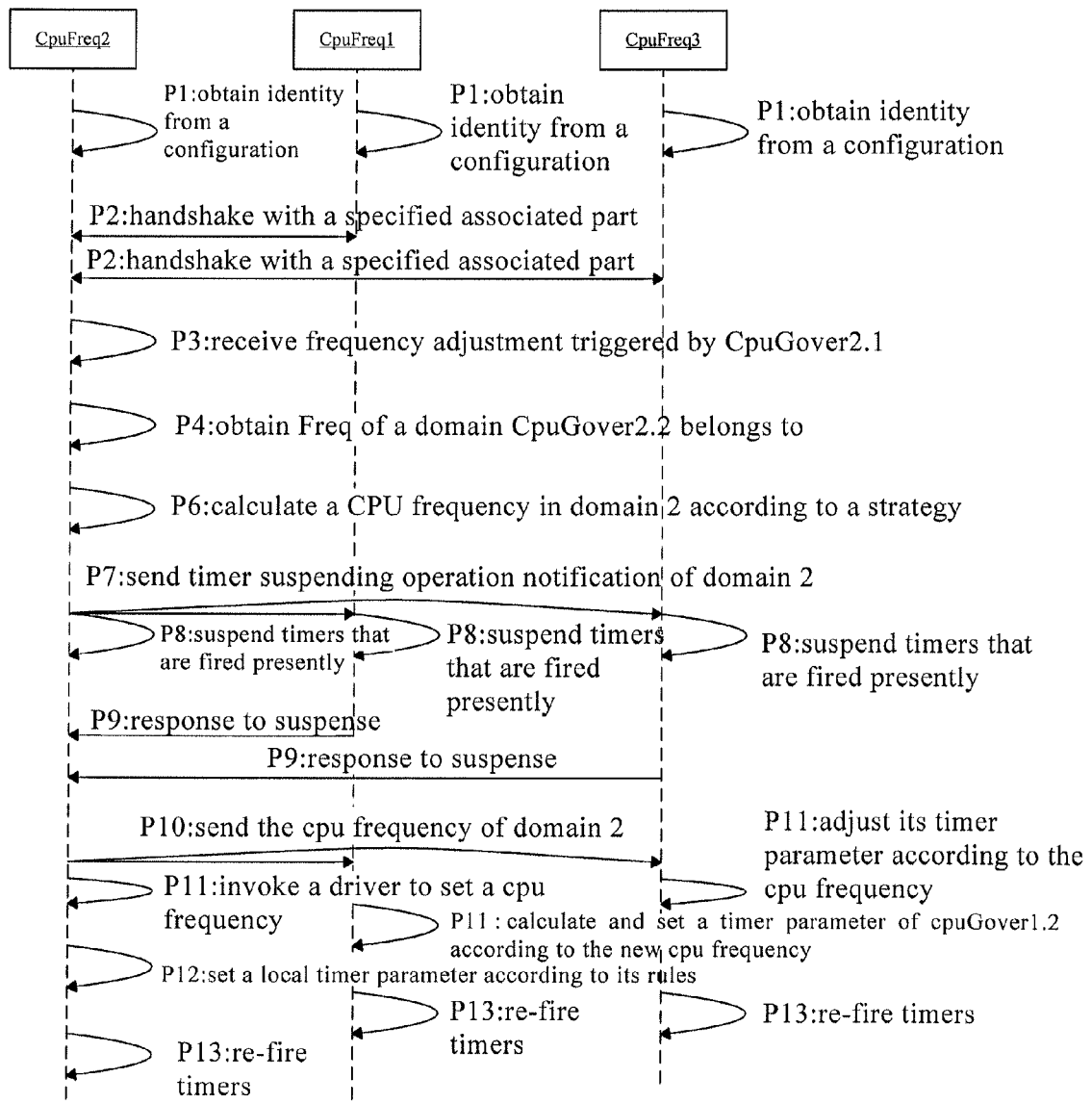
FIG. 8 is a sequential diagram of CPU frequency adjustment in a frequency adjustment flow triggered by CpuGover 2.2 provided in an embodiment of this embodiment.

As shown in FIG. 8, when CpuGover2.2 triggers the frequency adjustment flow, a primary hardware thread CpuFreq2 of an OS instance it belongs to is first reported, after CpuFreq2 has calculated a target CPU frequency to be adjusted to, it sends a suspending operation notification to the primary hardware thread CpuFreq2 of domain 1 and a secondary hardware thread CpuFreq3 of domain 2. When CpuFreq1, CpuFreq2 and CpuFreq3 have suspended timers that have been fired presently, CpuFreq2 invokes a CPU driving program to set the CPU frequency and sends the CPU frequency to CpuFreq2 and CpuFreq3. CpuFreq1 sets a local timer parameter according to its rules, while CpuFreq2 calculates and sets the timer parameter of CpuGover2.2 according to the new CPU frequency, and CpuFreq3 calculates and sets its timer parameter according to the new CPU frequency. After the timer parameter has been set, CpuFreq1, CpuFreq2 and CpuFreq3 re-fire the timers, and the present frequency adjustment is finished.

Embodiment 5 of CPU Frequency Adjustment

Figure 9:
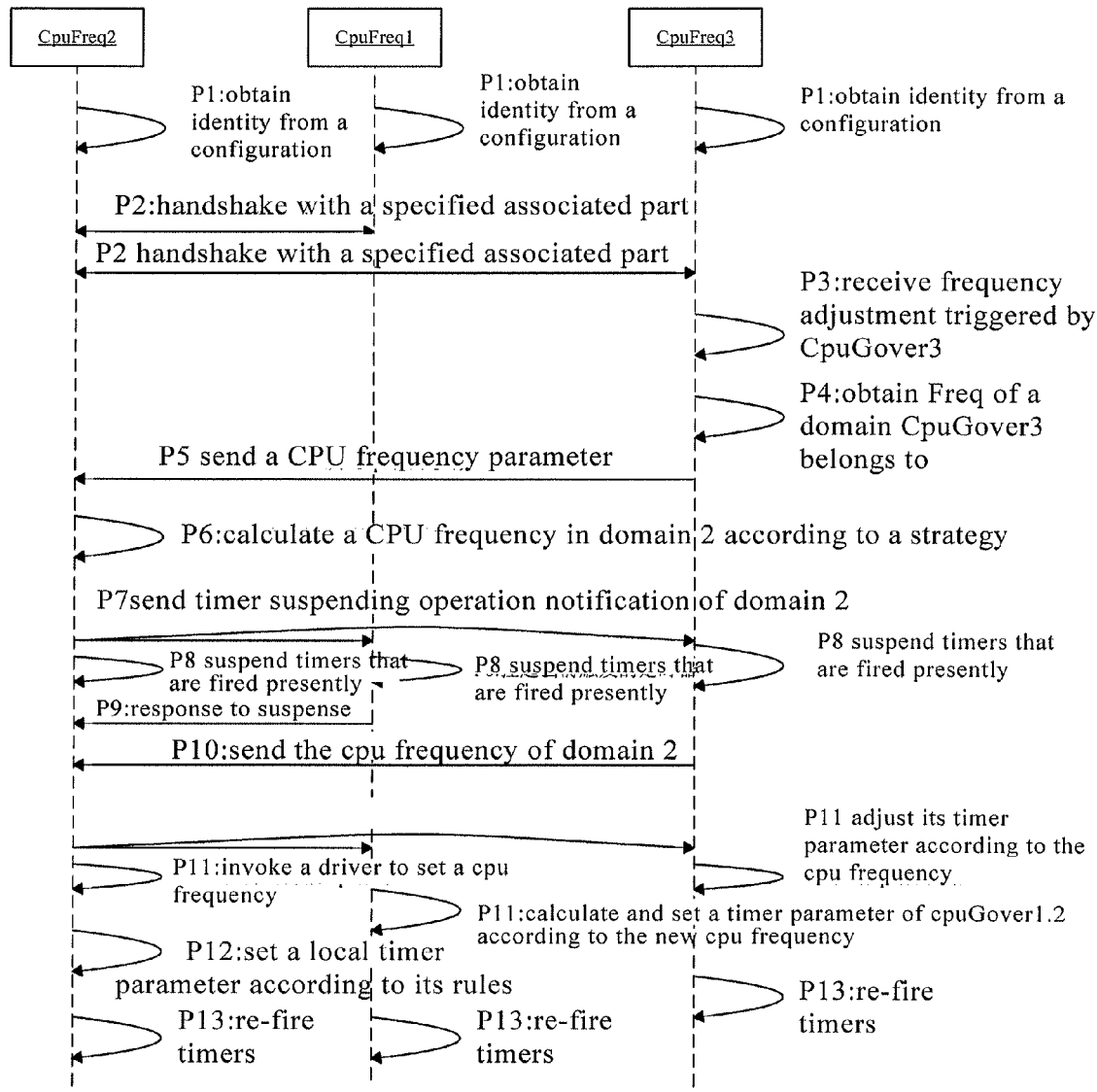
FIG. 9 is a sequential diagram of adjusting the CPU frequency in a frequency adjustment flow triggered by CpuGover 3 provided in an embodiment of this embodiment.

As shown in FIG. 9, when CpuGover3 triggers the frequency adjustment flow, a secondary hardware thread CpuFreq3 of an OS instance it belongs to is first reported (because OS3 does not have a primary hardware thread in domain 2, only a secondary hardware thread can be reported), CpuFreq3 sends a CPU frequency parameter to a primary hardware thread CpuFreq2 of a domain it belongs to, after CpuFreq2 has calculated a target CPU frequency to be adjusted to, it sends a suspending operation notification to CpuFreq2 and CpuFreq3. When CpuFreq1, CpuFreq2 and CpuFreq3 have suspended timers that have been fired presently, CpuFreq2 invokes a CPU driving program to set the CPU frequency and sends the CPU frequency to CpuFreq1 and CpuFreq3. CpuFreq1 and CpuFreq2 set a local timer parameter according to their own rules, while CpuFreq3 calculates and sets the timer parameter of CpuGover3 according to the new CPU frequency. After the timer parameter has been set, CpuFreq1, CpuFreq2 and CpuFreq3 re-fire the timers, and the present frequency adjustment is finished.

The embodiment provided in this disclosure synchronizes the CPU frequency value of threads in each domain according to the CPU occupation rate of each thread triggering frequency adjustment to achieve the synchronization of CPU frequency values in a multi-core system in an AMP deploying mode or a multi-core system in an AMP and SMP hybrid deploying mode, so as to realize CPU power conservation.

Those ordinary skilled in the art may understand that all or part steps of the above method embodiments can be implemented by a computer program that instructs relevant hardwares, the program described above can be stored in a computer readable storage medium, which when executed may perform steps contained in the above method embodiments. Wherein, the storage medium may comprise: magnetic discs, optical discs, read-only memory (ROM) or random access memory (RAM) or the like.

Figure 10:
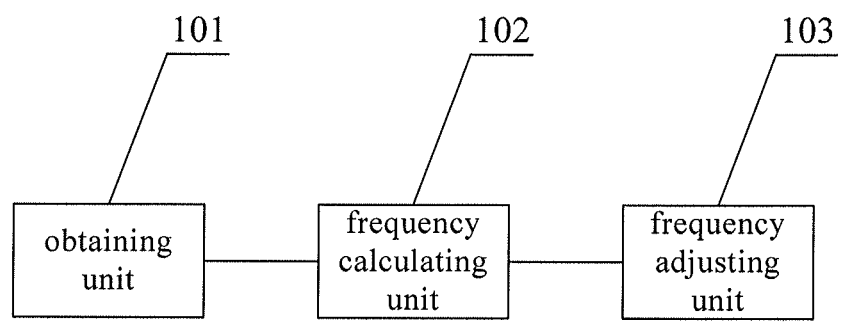
FIG. 10 is a schematic structural diagram of an apparatus for conserving CPU power provided in an embodiment of this embodiment.

An apparatus for conserving CPU power is also provided in an embodiment of this disclosure, as shown in FIG. 10, the apparatus may particularly comprise an obtaining unit 101, a frequency calculating unit 102 and a frequency adjusting unit 103.

The obtaining unit 101 is configured to obtain the CPU occupation rates of all threads triggering frequency adjustment in each domain and domains those threads belong to;

the frequency calculating unit 102 is configured to in a domain a thread triggering frequency adjustment belongs to, calculate a target CPU frequency to be adjusted to according to the CPU occupation rate of the thread triggering frequency adjustment;

the frequency adjusting unit 103 is configured to calculate a timer parameter according to the target CPU frequency obtained by the frequency calculating unit 102 and set a CPU frequency value for the thread triggering frequency adjustment.

Further, the obtaining unit may comprise a monitoring and sending sub-unit, configured to monitor the CPU occupation rates of all secondary threads in each domain, and if the CPU occupation rates of one or more of the secondary threads have variances larger than a threshold, send their CPU occupation rates;

the frequency calculating unit comprises a frequency obtaining sub-unit, configured to select a maximum CPU occupation rate value from the CPU occupation rates of all threads triggering frequency adjustment in each domain, and select a CPU frequency value that corresponds to the maximum CPU occupation rate value as a target CPU frequency according to a correspondence relationship between CPU occupation rates and CPU frequencies in a configuration table of an OS instance; the frequency adjusting unit comprises a timer suspending sub-unit, configured to suspend timers in domains those threads triggering frequency adjustment belong to.

Further, when frequency adjustment is triggered by different threads in different domains, the frequency adjusting-unit 103 may comprise the following cases.

1. When a thread triggering frequency adjustment and a primary hardware thread of an OS instance it belongs to are in the same domain, the frequency adjusting unit 103 comprises a first timer suspending sub-unit, a first frequency setting and sending sub-unit, a first timer parameter setting sub-unit, and a first timer firing sub-unit. The first timer suspending sub-unit is configured to, when a thread triggering frequency adjustment and a primary hardware thread of an OS instance it belongs to are in the same domain, simultaneously suspend a timer that is fired presently and timers in domains in which other threads of the OS instance are located; the first frequency setting and sending sub-unit is configured to cause the primary hardware thread which is in the same domain with the thread triggering frequency adjustment to invoke a CPU driving program to set a CPU frequency, and send the CPU frequency to the domains in which other threads of the OS instance are located; the first timer parameter setting sub-unit is configured to cause the primary hardware thread which is in the same domain with the thread triggering frequency adjustment to calculate and set a local timer parameter, to cause primary hardware threads of domains in which other threads of the OS instance are located to set a timer parameter for the other threads of the OS instance according to their own rules; the first timer firing sub-unit is configured to re-fire the timers of the domain in which the thread triggering frequency adjustment is located and the timers of the domains in which other threads of the OS instance are located.

2. When a thread triggering frequency adjustment and a primary hardware thread of an OS instance it belongs to are not in the same domain, the frequency adjusting unit 103 comprises a second CPU frequency parameter sending sub-unit, a second timer suspending sub-unit, a second frequency setting and sending sub-unit, a second timer parameter setting sub-unit, and a second timer firing sub-unit. The second CPU frequency parameter sending sub-unit is configured to, when a thread triggering frequency adjustment and a primary hardware thread of an OS instance it belongs to are not in the same domain, cause a primary hardware thread of an OS instance the thread triggering frequency adjustment belongs to send the CPU frequency parameter of the thread triggering frequency adjustment to a primary hardware thread of a domain the thread triggering frequency adjustment belongs to; the second timer suspending sub-unit is configured to simultaneously suspend timers that are fired presently and timers of domains in which other threads of the OS instance are located; the second frequency setting and sending sub-unit is configured to cause the primary hardware thread which is in the same domain with the thread triggering frequency adjustment to invoke a CPU driving program to set a CPU frequency, and send the CPU frequency to the domain in which thread triggering frequency adjustment is located; the second timer parameter setting sub-unit is configured to cause the primary hardware thread which is in the same domain with the thread triggering frequency adjustment to calculate and set a local timer parameter according to its own rules, to cause the primary hardware thread of an OS instance the thread triggering frequency adjustment belongs to, to set a timer parameter triggering frequency adjustment; the second timer firing sub-unit is configured to re-fire the timers of the domain in which the thread triggering frequency adjustment is located and the timers of the domains in which other threads of the OS instance are located.

3. When there is not a primary hardware thread of an OS instance in the domain a thread triggering frequency adjustment belongs to, the frequency adjusting unit 103 comprises a third CPU frequency parameter sending sub-unit, a third timer suspending sub-unit, a third frequency setting and sending sub-unit, a third timer parameter setting sub-unit, and a third timer firing sub-unit. The third CPU frequency parameter sending sub-unit is configured to, when there is no primary hardware thread in the domain a thread triggering frequency adjustment belongs to being a thread triggering frequency adjustment to, send a CPU frequency parameter to a primary hardware thread of an OS instance the thread triggering frequency adjustment belongs to; the third timer suspending sub-unit is configured to simultaneously suspend timers that are fired presently and timers of threads of other OS instances in the domain the thread triggering frequency adjustment belongs to; the third frequency setting and sending sub-unit is configured to cause the primary hardware thread which is in the same domain with the thread triggering frequency adjustment to invoke a CPU driving program to set a CPU frequency, and send the CPU frequency to hardware threads of other OS instances in the domain in which the thread triggering frequency adjustment is located; the third timer parameter setting sub-unit is configured to cause the primary hardware thread which is in the same domain with the thread triggering frequency adjustment to calculate and set a local timer parameter according to the new CPU frequency, cause the primary hardware threads of other OS instances in the domain in which the thread triggering frequency adjustment is located to set a local timer parameter according to its own rules; the third timer firing sub-unit is configured to re-fire the timers of the domain in which the thread triggering frequency adjustment is located and the timers of the hardware threads of other OS instances in the domain in which the thread triggering frequency adjustment is located.

The functions of various unit and sub-unit comprised in the above apparatus have been described in detail in the preceding method embodiment, which will not be described in detail in this embodiment.

The embodiment provided in this disclosure synchronizes the CPU frequency value of threads in each domain according to the CPU occupation rate of each thread triggering frequency adjustment to achieve the synchronization of CPU frequency values in a multi-core system in an AMP deploying mode or a multi-core system in an AMP and SMP hybrid deploying mode, so as to realize CPU power conservation.

The description above is merely some preferable embodiments of this disclosure, however, the scope of this disclosure is not limited thereto, and any skilled in the art may easily conceive variations or substitutions within the scope disclosed in this disclosure, which should be covered in the scope of this disclosure. Therefore, the scope of this disclosure should be consistent with the scope of the claims appended below.

What is claimed is:

1. A method for conserving CPU power, comprising:
   obtaining CPU occupation rates of all threads triggering frequency adjustment in each domain and domains to which those threads belong to;
   in a domain a thread triggering frequency adjustment belongs to, calculating a target CPU frequency to be adjusted to according to the CPU occupation rate of the thread triggering frequency adjustment;
   calculating a timer parameter according to the target CPU frequency and setting a CPU frequency value for the thread triggering frequency adjustment, wherein setting a CPU frequency value for the thread triggering frequency adjustment comprises:
   when a thread triggering frequency adjustment and a primary hardware thread of an OS instance are in the same domain, simultaneously suspending a timer that is fired presently and timers in domains in which other threads of the OS instance are located;
   causing the primary hardware thread which is in the same domain with the thread triggering frequency adjustment to invoke a CPU driving program to set a CPU frequency, and send the CPU frequency to the domains in which other threads of the OS instance are located;
   causing the primary hardware thread which is in the same domain with the thread triggering frequency adjustment to calculate and set a local timer parameter, and causing primary hardware threads of domains in which other threads of the OS instance are located to set a timer parameter for the other threads of the OS instance according to their own rules;
   re-firing the timers of the domain in which the thread triggering frequency adjustment is located and the timers of the domains in which other threads of the OS instance are located.

2. The method according to claim 1, wherein triggering frequency adjustment comprises:
   monitoring CPU occupation rates of all secondary threads in each domain, and if the CPU occupation rates of one or more of the secondary threads have variances larger than a threshold, sending the CPU occupation rates.

3. The method according to claim 1, wherein after calculating a target CPU frequency to be adjusted to according to the CPU occupation rate of the thread triggering frequency adjustment, the method further comprises:
   suspending timers in the domain the thread triggering frequency adjustment belongs to.

4. The method according to claim 1, wherein calculating a target CPU frequency to be adjusted to according to the CPU occupation rate of the thread triggering frequency adjustment comprises:
   selecting a maximum CPU occupation rate value from the CPU occupation rates of all threads triggering frequency adjustment in each domain, and selecting a CPU frequency value that corresponds to the maximum CPU occupation rate value as a target CPU frequency according to a correspondence relationship between CPU occupation rates and CPU frequencies in a configuration table of an OS instance.

5. A method for conserving CPU power, comprising:
   obtaining CPU occupation rates of all threads triggering frequency adjustment in each domain and domains to which those threads belong to
   in a domain a thread triggering frequency adjustment belongs to, calculating a target CPU frequency to be adjusted to according to the CPU occupation rate of the thread triggering frequency adjustment;
   calculating a timer parameter according to the target CPU frequency and setting a CPU frequency value for the thread triggering frequency adjustment, wherein setting a CPU frequency value for the thread triggering frequency adjustment comprises:
   when a thread triggering frequency adjustment and a primary hardware thread of an OS instance it belongs to are not in the same domain, causing, a primary hardware thread of an OS instance the thread triggering frequency adjustment belongs to, to send the CPU frequency parameter of the thread triggering frequency adjustment to a primary hardware thread of a domain the thread triggering frequency adjustment belongs to;

simultaneously suspending timers that are fired presently and timers of domains in which other threads of the OS instance are located;

causing the primary hardware thread which is in the same domain with the thread triggering frequency adjustment to invoke a CPU driving program to set a CPU frequency, and send the CPU frequency to the domain in which thread triggering frequency adjustment is located;

causing the primary hardware thread which is in the same domain with the thread triggering frequency adjustment to calculate and set a local timer parameter according to its own rules, and causing, the primary hardware thread of an OS instance the thread triggering frequency adjustment belongs to, to calculate and set a timer parameter triggering frequency adjustment;

re-firing the timers of the domain in which the thread triggering frequency adjustment is located and the timers of the domains in which other threads of the OS instance are located.

6. The method according to claim 5, wherein triggering frequency adjustment comprises:

monitoring CPU occupation rates of all secondary threads in each domain, and if the CPU occupation rates of one or more of the secondary threads have variances larger than a threshold, sending the CPU occupation rates.

7. The method according to claim 5, wherein calculating a target CPU frequency to be adjusted to according to the CPU occupation rate of the thread triggering frequency adjustment comprises:

selecting a maximum CPU occupation rate value from the CPU occupation rates of all threads triggering frequency adjustment in each domain, and selecting a CPU frequency value that corresponds to the maximum CPU occupation rate value as a target CPU frequency according to a correspondence relationship between CPU occupation rates and CPU frequencies in a configuration table of an OS instance.

8. The method according to claim 5, wherein after calculating a target CPU frequency to be adjusted to according to the CPU occupation rate of the thread triggering frequency adjustment, the method further comprises:

suspending timers in the domain the thread triggering frequency adjustment belongs to.

9. A method for conserving CPU power, comprising:

obtaining CPU occupation rates of all threads triggering frequency adjustment in each domain and domains to which those threads belong to in a domain a thread triggering frequency adjustment belongs to, calculating a target CPU frequency to be adjusted to according to the CPU occupation rate of the thread triggering frequency adjustment;

calculating a timer parameter according to the target CPU frequency and setting a CPU frequency value for the thread triggering frequency adjustment, wherein setting a CPU frequency value for the thread triggering frequency adjustment comprises:

when there is no primary hardware thread in the domain a thread triggering frequency adjustment belongs to being a thread triggering frequency adjustment, sending a CPU frequency parameter to a primary hardware thread of an OS instance the thread triggering frequency adjustment belongs to;

simultaneously suspending timers that are fired presently and timers of threads of other OS instances in the domain the thread triggering frequency adjustment belongs to;

causing the primary hardware thread which is in the same domain with the thread triggering frequency adjustment to invoke a CPU driving program to set a CPU frequency, and send the CPU frequency to hardware threads of other OS instances in the domain in which the thread triggering frequency adjustment is located;

causing the primary hardware thread which is in the same domain with the thread triggering frequency adjustment to calculate and set a local timer parameter according to the new CPU frequency, and causing the primary hardware threads of other OS instances in the domain in which the thread triggering frequency adjustment is located to set a local timer parameter according to its own rules;

re-firing the timers of the domain in which the thread triggering frequency adjustment is located and the timers of the hardware threads of other OS instances in the domain in which the thread triggering frequency adjustment is located.

10. The method according to claim 9, wherein triggering frequency adjustment comprises:

monitoring CPU occupation rates of all secondary threads in each domain, and if the CPU occupation rates of one or more of the secondary threads have variances larger than a threshold, sending the CPU occupation rates.

11. The method according to claim 9, wherein calculating a target CPU frequency to be adjusted to according to the CPU occupation rate of the thread triggering frequency adjustment comprises:

selecting a maximum CPU occupation rate value from the CPU occupation rates of all threads triggering frequency adjustment in each domain, and selecting a CPU frequency value that corresponds to the maximum CPU occupation rate value as a target CPU frequency according to a correspondence relationship between CPU occupation rates and CPU frequencies in a configuration table of an OS instance.

12. The method according to claim 9, wherein after calculating a target CPU frequency to be adjusted to according to the CPU occupation rate of the thread triggering frequency adjustment, the method further comprises:

suspending timers in the domain the thread triggering frequency adjustment belongs to.

13. A non-transitory computer readable storage medium configured to store executable instructions for performing a method comprising:

obtaining CPU occupation rates of all threads triggering frequency adjustment in each domain and domains to which those threads belong to;

in a domain a thread triggering frequency adjustment belongs to, calculating a target CPU frequency to be adjusted to according to the CPU occupation rate of the thread triggering frequency adjustment;

calculating a timer parameter according to the target CPU frequency and setting a CPU frequency value for the thread triggering frequency adjustment, wherein setting a CPU frequency value for the thread triggering frequency adjustment comprises:

when a thread triggering frequency adjustment and a primary hardware thread of an OS instance are in the same domain, simultaneously suspending a timer that is fired presently and timers in domains in which other threads of the OS instance are located;

causing the primary hardware thread which is in the same domain with the thread triggering frequency adjustment to invoke a CPU driving program to set a CPU frequency, and send the CPU frequency to the domains in which other threads of the OS instance are located;

causing the primary hardware thread which is in the same domain with the thread triggering frequency adjustment to calculate and set a local timer parameter, and causing primary hardware threads of domains in which other threads of the OS instance are located to set a timer parameter for the other threads of the OS instance according to their own rules;

re-firing the timers of the domain in which the thread triggering frequency adjustment is located and the timers of the domains in which other threads of the OS instance are located.

14. The non-transitory computer readable storage medium according to claim 13, wherein triggering frequency adjustment comprises:

monitoring CPU occupation rates of all secondary threads in each domain, and if the CPU occupation rates of one or more of the secondary threads have variances larger than a threshold, sending the CPU occupation rates.

15. The non-transitory computer readable storage medium according to claim 13, wherein calculating a target CPU frequency to be adjusted to according to the CPU occupation rate of the thread triggering frequency adjustment comprises:

selecting a maximum CPU occupation rate value from the CPU occupation rates of all threads triggering frequency adjustment in each domain, and selecting a CPU frequency value that corresponds to the maximum CPU occupation rate value as a target CPU frequency according to a correspondence relationship between CPU occupation rates and CPU frequencies in a configuration table of an OS instance.

16. The non-transitory computer readable storage medium according to claim 13, wherein after calculating a target CPU frequency to be adjusted to according to the CPU occupation rate of the thread triggering frequency adjustment, further comprises:

suspending timers in the domain the thread triggering frequency adjustment belongs to.

17. A non-transitory computer readable storage medium configured to store executable instructions for performing a method comprising:

obtaining CPU occupation rates of all threads triggering frequency adjustment in each domain and domains to which those threads belong to;

in a domain a thread triggering frequency adjustment belongs to, calculating a target CPU frequency to be adjusted to according to the CPU occupation rate of the thread triggering frequency adjustment;

calculating a timer parameter according to the target CPU frequency and setting a CPU frequency value for the thread triggering frequency adjustment, wherein setting a CPU frequency value for the thread triggering frequency adjustment comprises:

when a thread triggering frequency adjustment and a primary hardware thread of an OS instance it belongs to are not in the same domain, causing, a primary hardware thread of an OS instance the thread triggering frequency adjustment belongs to, to send the CPU frequency parameter of the thread triggering frequency adjustment to a primary hardware thread of a domain the thread triggering frequency adjustment belongs to;

simultaneously suspending timers that are fired presently and timers of domains in which other threads of the OS instance are located;

causing the primary hardware thread which is in the same domain with the thread triggering frequency adjustment to invoke a CPU driving program to set a CPU frequency, and send the CPU frequency to the domain in which thread triggering frequency adjustment is located;

causing the primary hardware thread which is in the same domain with the thread triggering frequency adjustment to calculate and set a local timer parameter according to its own rules, and causing, the primary hardware thread of an OS instance the thread triggering frequency adjustment belongs to, to calculate and set a timer parameter triggering frequency adjustment;

re-firing the timers of the domain in which the thread triggering frequency adjustment is located and the timers of the domains in which other threads of the OS instance are located.

18. The non-transitory computer readable storage medium according to claim 17, wherein triggering frequency adjustment comprises:

monitoring CPU occupation rates of all secondary threads in each domain, and if the CPU occupation rates of one or more of the secondary threads have variances larger than a threshold, sending the CPU occupation rates.

19. The non-transitory computer readable storage medium according to claim 17, wherein calculating a target CPU frequency to be adjusted to according to the CPU occupation rate of the thread triggering frequency adjustment comprises:

selecting a maximum CPU occupation rate value from the CPU occupation rates of all threads triggering frequency adjustment in each domain, and selecting a CPU frequency value that corresponds to the maximum CPU occupation rate value as a target CPU frequency according to a correspondence relationship between CPU occupation rates and CPU frequencies in a configuration table of an OS instance.

20. The non-transitory computer readable storage medium according to claim 17, wherein after calculating a target CPU frequency to be adjusted to according to the CPU occupation rate of the thread triggering frequency adjustment, further comprises:

suspending timers in the domain the thread triggering frequency adjustment belongs to.

21. A non-transitory computer readable storage medium configured to store executable instructions for performing a method comprising:

obtaining CPU occupation rates of all threads triggering frequency adjustment in each domain and domains to which those threads belong to;

in a domain a thread triggering frequency adjustment belongs to, calculating a target CPU frequency to be adjusted to according to the CPU occupation rate of the thread triggering frequency adjustment;

calculating a timer parameter according to the target CPU frequency and setting a CPU frequency value for the thread triggering frequency adjustment, wherein setting a CPU frequency value for the thread triggering frequency adjustment comprises:

when there is no primary hardware thread in the domain a thread triggering frequency adjustment belongs to being a thread triggering frequency adjustment, sending a CPU frequency parameter to a primary hardware thread of an OS instance the thread triggering frequency adjustment belongs to;

simultaneously suspending timers that are fired presently and timers of threads of other OS instances in the domain the thread triggering frequency adjustment belongs to;

causing the primary hardware thread which is in the same domain with the thread triggering frequency adjustment to invoke a CPU driving program to set a CPU frequency, and send the CPU frequency to hardware threads of other OS instances in the domain in which the thread triggering frequency adjustment is located;

causing the primary hardware thread which is in the same domain with the thread triggering frequency adjustment to calculate and set a local timer parameter according to the new CPU frequency, and causing the primary hardware threads of other OS instances in the domain in which the thread triggering frequency adjustment is located to set a local timer parameter according to its own rules;

re-firing the timers of the domain in which the thread triggering frequency adjustment is located and the timers of the hardware threads of other OS instances in the domain in which the thread triggering frequency adjustment is located.

22. The non-transitory computer readable storage medium according to claim 21, wherein triggering frequency adjustment comprises:

monitoring CPU occupation rates of all secondary threads in each domain, and if the CPU occupation rates of one or more of the secondary threads have variances larger than a threshold, sending the CPU occupation rates.

23. The non-transitory computer readable storage medium according to claim 21, wherein calculating a target CPU frequency to be adjusted to according to the CPU occupation rate of the thread triggering frequency adjustment comprises:

selecting a maximum CPU occupation rate value from the CPU occupation rates of all threads triggering frequency adjustment in each domain, and selecting a CPU frequency value that corresponds to the maximum CPU occupation rate value as a target CPU frequency according to a correspondence relationship between CPU occupation rates and CPU frequencies in a configuration table of an OS instance.

24. The non-transitory computer readable storage medium according to claim 21, wherein after calculating a target CPU frequency to be adjusted to according to the CPU occupation rate of the thread triggering frequency adjustment, further comprises:

suspending timers in the domain the thread triggering frequency adjustment belongs to.

* * * * *